US012122860B2

(12) United States Patent
Tsujino et al.

(10) Patent No.: US 12,122,860 B2
(45) Date of Patent: Oct. 22, 2024

(54) PHOTOCURABLE SUPPORT MATERIAL COMPOSITION FOR INKJET 3D PRINTERS, INK FOR INKJET 3D PRINTERS, CARTRIDGE FOR INKJET 3D PRINTERS, METHOD FOR PRODUCING SUPPORT MATERIAL AND METHOD FOR PRODUCING OPTICALLY SHAPED ARTICLE

(71) Applicant: NIPPON SHOKUBAI CO., LTD., Osaka (JP)

(72) Inventors: Yasunori Tsujino, Suita (JP); Minoru Urata, Suita (JP); Noriaki Majima, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 238 days.

(21) Appl. No.: 16/328,950

(22) PCT Filed: Aug. 30, 2017

(86) PCT No.: PCT/JP2017/031210
§ 371 (c)(1),
(2) Date: Feb. 27, 2019

(87) PCT Pub. No.: WO2018/043582
PCT Pub. Date: Mar. 8, 2018

(65) Prior Publication Data
US 2019/0241684 A1 Aug. 8, 2019

(30) Foreign Application Priority Data

Sep. 1, 2016 (JP) ................................ 2016-170655
Mar. 17, 2017 (JP) ................................ 2017-052167

(51) Int. Cl.
| B29C 64/00 | (2017.01) |
| B29C 64/40 | (2017.01) |
| B33Y 10/00 | (2015.01) |
| B33Y 70/00 | (2020.01) |
| C08F 20/06 | (2006.01) |
| B29K 105/00 | (2006.01) |
| B33Y 70/10 | (2020.01) |

(52) U.S. Cl.
CPC .............. *C08F 20/06* (2013.01); *B29C 64/40* (2017.08); *B33Y 10/00* (2014.12); *B33Y 70/00* (2014.12); *B29K 2105/0002* (2013.01); *B33Y 70/10* (2020.01)

(58) Field of Classification Search
CPC .................................. C08F 20/06; B33Y 10/00
See application file for complete search history.

(56) References Cited

U.S. PATENT DOCUMENTS

| 2,956,046 | A | * | 10/1960 | Glavis | ..................... C08F 20/06 |
| | | | | | 526/240 |
| 3,058,958 | A | * | 10/1962 | Glavis | ................... C08F 120/06 |
| | | | | | 526/240 |
| 2004/0135292 | A1 | * | 7/2004 | Coats | ...................... B29C 64/40 |
| | | | | | 264/401 |
| 2005/0218549 | A1 | * | 10/2005 | Farr | ...................... G03F 7/0047 |
| | | | | | 264/109 |
| 2013/0234370 | A1 | | 9/2013 | Suzuki et al. | |
| 2016/0091475 | A1 | * | 3/2016 | Ponomarev | ............. G01M 9/06 |
| | | | | | 427/256 |
| 2016/0288206 | A1 | * | 10/2016 | Ohtaki | .................. C04B 35/486 |
| 2018/0264740 | A1 | * | 9/2018 | Ohnishi | ................ B29C 64/393 |
| 2018/0291219 | A1 | | 10/2018 | Kiyosada | |
| 2019/0002617 | A1 | * | 1/2019 | Kotani | ................... C09J 133/08 |
| 2019/0009465 | A1 | * | 1/2019 | Monroe | ................ B29C 64/165 |
| 2019/0233634 | A1 | * | 8/2019 | Ota | .......................... C08F 2/44 |
| 2020/0001527 | A1 | * | 1/2020 | Park | ...................... B29C 64/393 |
| 2020/0062877 | A1 | * | 2/2020 | Knopf | ........................ C08F 2/38 |
| 2020/0339830 | A1 | * | 10/2020 | Masada | ................... B22F 10/14 |
| 2022/0227044 | A1 | * | 7/2022 | Stasiak | ................ B29C 64/165 |
| 2022/0331866 | A1 | * | 10/2022 | Fielder | ................... B22F 12/40 |
| 2024/0017484 | A1 | * | 1/2024 | Saito | ...................... B33Y 10/00 |

FOREIGN PATENT DOCUMENTS

| JP | 2012-111226 A | 6/2012 |
| JP | 2016-2704 A | 1/2016 |
| WO | 2016/121587 A1 | 8/2016 |

OTHER PUBLICATIONS

International Search Report dated Oct. 10, 2017, issued in counterpart International Application No. PCT/JP2017/031210 (1 page).

* cited by examiner

*Primary Examiner* — Nicholas R Krasnow
(74) *Attorney, Agent, or Firm* — WHDA, LLP

(57) ABSTRACT

In the present invention, a photocurable support material composition for an inkjet 3D printer comprises a water-soluble ethylenically unsaturated monomer containing an ionic group and a counter ion, and comprises a photopolymerization initiator. The ionic group is preferably at least one selected from a group consisting of carboxylic acid group, phosphoric acid group, and sulfonic acid group. The counter ion is preferably at least one selected from a group consisting of sodium ion, potassium ion, and ammonium ion.

9 Claims, No Drawings

PHOTOCURABLE SUPPORT MATERIAL COMPOSITION FOR INKJET 3D PRINTERS, INK FOR INKJET 3D PRINTERS, CARTRIDGE FOR INKJET 3D PRINTERS, METHOD FOR PRODUCING SUPPORT MATERIAL AND METHOD FOR PRODUCING OPTICALLY SHAPED ARTICLE

FIELD

The present invention relates to photocurable support material compositions for inkjet 3D printers, inks for inkjet 3D printers, cartridges for inkjet 3D printers, methods for producing support materials and methods for producing optically shaped articles.

BACKGROUND

In recent years, optically fabrication methods which are based on inkjet methods have been proposed. In the methods, liquid photocurable resins that come out of inkjet nozzles are cured and stacked to be photomolded. Inks for inkjet 3D printers used in these optically fabrication methods include model materials constituting molded bodies by photocuring with UV or the like, and support materials used as materials supporting the model materials upon stacking the model materials three-dimensionally. By stacking the layers of the model materials on the support materials, overhang structures or hollow structures can be formed.

Patent Literature 1 describes a 3D molding ink set containing a 3D molding composition liquid and a support material composition liquid. The 3D molding composition liquid containing at least two kinds of monofunctional monomers having an ethylene polymerizable group and a photoinitiator. As the monofunctional monomers, monofunctional monomers having ionic groups and monofunctional monomers having no ionic group are contained. The 3D molding composition liquid further contains counter ions to the ionic groups. It is described that the above-mentioned 3D molding composition liquid can be cured with ultraviolet irradiation, and furthermore, can provide 3D shaped articles which have high toughness, and are not easily broken.

The support materials are required to have enough hardness (supportability) to withstand stacking layers. After curing, the support materials are removed from the model materials by water dissolution, heating, chemical reaction, hydraulic washing, electromagnetic wave irradiation, differential thermal expansion or the like. Therefore, it is also required that photocurable support material compositions for inkjet 3D printers can be easily removed from the model materials after curing.

Patent Literature 2 describes a support material for supporting a shape during optically fabricating of an optically shaped article in an ink jet optically fabrication method. The support material comprises 5 to 40 parts by weight of N-hydroxyethylacrylamide and 95 to 60 parts by weight of PPG. Although the abovementioned support material is excellent in water solubility, there is a problem that the hardness of the cured product is low.

CITATION LIST

Patent Literature

[Patent Literature 1] Japanese Unexamined Patent Application Publication No. 2016-2704

[Patent Literature 2] Japanese Unexamined Patent Application Publication No. 2012-111226

SUMMARY

Technical Problem

Accordingly, the object of the present invention is to provide a photocurable support material composition for an inkjet 3D printer, an ink for an inkjet 3D printer, a cartridge for an inkjet 3D printer, a method for producing a support material, and a method for producing an optically shaped article, in which a cured product after curing has excellent water solubility and hardness of the cured product is sufficient.

Solution to Problem

The inventors have intensively studied to solve the above-mentioned problems. As a result, they found that by a composition containing a watersoluble ethylenically unsaturated monomer containing a specific group, a photocurable support material composition for an inkjet 3D printer, an ink for an inkjet 3D printer, a cartridge for an inkjet 3D printer, a method for producing a support material, and a method for producing an optically shaped article, in which hardness of a cured product after curing is sufficient and the cured product has excellent water solubility. Then finally, they have completed the present invention.

In the present invention, a photocurable support material composition for an inkjet 3D printer comprises a water-soluble ethylenically unsaturated monomer containing an ionic group and a counter ion, and comprises a photopolymerization initiator.

Preferably, in the photocurable support material composition for an inkjet 3D printer of the present invention, a content of the water-soluble ethylenically unsaturated monomer is more than 30 mass % in 100 mass % of the photocurable support material composition for an inkjet 3D printer.

Preferably, the photocurable support material composition for an inkjet 3D printer of the present invention further comprises another unsaturated monomer in an amount of less than 2 mass % in 100 mass % of the photocurable support material composition for an inkjet 3D printer.

Preferably, the photocurable support material composition for an inkjet 3D printer of the present invention further comprises an organic acid and/or a salt thereof.

Preferably, the ionic group is at least one selected from a group consisting of carboxylic acid group, phosphoric acid group and sulfonic acid group.

Preferably, the counter ion is at least one selected from a group consisting of sodium ion, potassium ion and ammonium ion.

Preferably, the water-soluble ethylenically unsaturated monomer has a carbon number of 3 to 15.

Preferably, the photocurable support material composition for an inkjet 3D printer further comprises a solvent.

Preferably, the photocurable support material composition for an inkjet 3D printer further comprises at least one of other water-soluble ethylenically unsaturated monomer containing an ionic group and a counter ion, in which the counter ion is selected from a group consisting of zinc ion, magnesium ion, calcium ion, aluminum ion and neodymium ion.

Preferably, the photocurable support material composition for an inkjet 3D printer comprises: 20 to 70 mass % of the water-soluble ethylenically unsaturated monomer; 0.05 to 10.0 mass % of the photopolymerization initiator; and 20 to 75 mass % of a solvent.

In an ink for an inkjet 3D printer of the present invention, the ink comprises the photocurable support material composition for an inkjet 3D printer.

Further, in a cartridge for an inkjet 3D printer of the present invention, the cartridge is filled with the ink for an inkjet 3D printer.

Further, in a method for producing a support material of the present invention, the support material is formed by using the photocurable support material composition for an inkjet 3D printer or the ink for an inkjet 3D printer.

Further, in a method for producing an optically shaped article of the present invention, the photocurable support material composition for an inkjet 3D printer or the ink for an inkjet 3D printer is used, and the method comprises: a step for forming a support material by using the photocurable support material composition for an inkjet 3D printer or the ink for an inkjet 3D printer; a step for forming a model material; and a step for removing the support material.

Advantageous Effects of Invention

According to the photocurable support material composition for an inkjet 3D printer of the present invention, the photocurable support material composition for an inkjet 3D printer, the ink for an inkjet 3D printer, the cartridge for an inkjet 3D printer, the method for producing a support material, and the method for producing an optically shaped article, in which a cured product after curing has excellent water solubility and hardness of the cured product is sufficient, can be provided.

DESCRIPTION OF EMBODIMENTS

Photocurable Support Material Composition for Inkjet 3D Printer

Photocurable support material compositions for inkjet 3D printers of the present invention (hereinafter sometimes simply referred to as photocurable support material compositions) contain water-soluble ethylenically unsaturated monomers that contain ionic groups and counter ions and photopolymerization initiators. In the photocurable support material compositions of the present invention, hardness of cured products after curing is sufficient and the cured products are excellent in water solubility.

1. Water-Soluble Ethylenically Unsaturated Monomer

The water-soluble ethylenically unsaturated monomers contained in the photocurable support material compositions of the present invention have monomers having one or more ethylenically unsaturated groups in a molecule. They are also monomers having high water solubility by containing ionic groups and counter ions.

Examples of the ethylenically unsaturated groups include ethylene group, propenyl group, butenyl group, vinylphenyl group, (meth) acryl group, allyl ether group, vinyl ether group, maleyl group, maleimide group, (meth) acrylamide group, acetyl vinyl group, vinylamide group and the like. In the present specification, "(meth) acryl" means either or both of "acryl" and "methacryl", "(meth) acrylate" means either or both of "acrylate" and "methacrylate". Among them, (meth) acryl group, vinyl ether group and (meth) acrylamide group are preferable, and (meth) acryl group is more preferable.

Examples of the ionic groups include carboxylic acid, phosphoric acid, sulfonic acid and the like. Among them, carboxylic acid is preferable.

Examples of the counter ions include monovalent counter ions such as sodium ion, potassium ion, and ammonium ion; polyvalent metal ions such as zinc ion, magnesium ion, calcium ion, aluminum ion, neodymium ion. Among them, the monovalent counter ions are preferable, and sodium ion, potassium ion, or ammonium ion is more preferably used, and potassium ion is further preferably used. In addition to the monovalent counter ions, it is also preferable to use the polyvalent metal ions such as zinc ion, magnesium ion, calcium ion, aluminum ion or neodymium ion.

When the water-soluble ethylenically unsaturated monomers containing the monovalent counter ions and the water-soluble ethylenically unsaturated monomers containing polyvalent metal ions are used together, it is possible to further improve supportability of the cured products obtained by photocuring the photocurable support material compositions for inkjet 3D printers. It is preferred embodiments of the present invention to further use below-mentioned organic acids and/or salts thereof together in addition to the above-mentioned monomers. Preferable examples of the polyvalent metal ions are zinc ion, magnesium ion, and calcium ion.

A total content of the water-soluble ethylenically unsaturated monomers containing the monovalent counter ions as the counter ions and the water-soluble ethylenically unsaturated monomers containing the polyvalent metal ions as the counter ions is preferably from 20 to 70 mass %, more preferably from 25 to 65 mass %, and further preferably from 30 to 60 mass %, in 100 mass % of the photocurable support material composition for inkjet 3D printers. A lower limit is particularly preferably more than 30 mass %.

A content of the water-soluble ethylenically unsaturated monomers containing the polyvalent metal ions as the counter ions is preferably not more than 15 mass %, more preferably not more than 10 mass % as an upper limit, and preferably not less than 0.5 mass %, more preferably not less than 1 mass % as a lower limit, in 100 mass % of the photocurable support material composition for inkjet 3D printers. In this case, supportability of the photocurable support material compositions for inkjet 3D printers can be further improved, and solubility of the compositions can be also further improved.

In the photocurable support material compositions for inkjet 3D printers according to the present invention, examples of the water-soluble ethylenically unsaturated monomers containing carboxylic acid as the ionic groups and containing the counter ion include: monovalent salts such as alkali metal salts, for example, sodium salt and potassium salt, and ammonium salt; polyvalent salts such as zinc salt, magnesium salts calcium salt, aluminum salt, and neodymium salt; and the like, of acrylic acid, methacrylic acid, maleic acid, fumaric acid, 2-(meth) acryloyloxybenzoic acid, 3-(meth) acryloyloxybenzoic acid, 4-(meth) acryloyloxybenzoic acid, 2-(meth) acryloyloxyethylhexahydrophthalic acid, 2-(meth) acryloyloxyethylphthalic acid, 2-(meth) acryloyloxyethylsuccinic acid, 2-vinylbenzoic acid, 3-vinylbenzoic acid, 4-vinylbenzoic acid, N-(meth) acryloylaspartic acid, ω-(meth) acroylalkane-1,1 dicarboxylic acid or the like.

Among them, the monovalent salts such as the alkali metal salts, for example, the sodium salt and the potassium salt, and the ammonium salts are preferable. The sodium salts, the potassium salts or the ammonium salts are more preferable. The potassium salts are further preferable.

When the monovalent salts and the polyvalent metal salts of the carboxylic acids are used together, supportability of the cured products obtained by photocuring the photocurable support material compositions for inkjet 3D printers can be further improved. Further, it is preferred embodiments of the present invention to further use the below-described organic acids and/or the salts thereof in addition to the above-mentioned monomers. The zinc salts, the magnesium salts and the calcium salts are preferable as the polyvalent metal salts of the carboxylic acid.

A total content of the monovalent salts and the polyvalent metal salts of the carboxylic acids is preferably from 20 to 70 mass %, more preferably from 25 to 65 mass %, further preferably from 30 to 60 mass % in 100 mass % of the photocurable support material composition for inkjet 3D printers. A lower limit is particularly preferably more than 30 mass %.

A content of the polyvalent metal salts of the carboxylic acids is preferably not more than 15 mass %, more preferably not more than 10 mass % as an upper limit, and preferably not less than 0.5 mass %, more preferably not less than 1 mass % as a lower limit, in 100 mass % of the photocurable support material composition for inkjet 3D printers. In this case, supportability of the photocurable support material compositions for inkjet 3D printers can be further improved, and solubility of the compositions can be also further improved.

Preferable examples of the water-soluble ethylenically unsaturated monomers containing the carboxylic acids as the ionic groups and containing the counter ions include sodium salts, potassium salts, ammonium salts and zinc salts, having from 3 to 15 carbon atoms. Sodium salts, potassium salts, ammonium salts and zinc salts, having from 3 to 12 carbon atoms are more preferable. The number of carbon atoms is more preferably from 3 to 9, further preferably from 3 to 6. Among them, potassium (meth) acrylate, sodium (meth) acrylate, ammonium (meth) acrylate or zinc (meth) acrylate is particularly preferable. By using monomers having a small number of carbon atoms, hydrophobic portions in a molecule can be made small, and water solubility of the water-soluble ethylenically unsaturated monomers can be further enhanced.

In the photocurable support material compositions for inkjet 3D printers according to the present invention, examples of the water-soluble ethylenically unsaturated monomers containing the phosphoric acids as the ionic groups and containing the counter ions include sodium salts, potassium salts and ammonium salts of mono (2-acryloyloxyethyl) acid phosphate, mono (2-methacryloyloxyethyl) acid phosphate, diphenyl (2-acryloyloxyethyl) phosphate, diphenyl (2-methacryloyloxyethyl) phosphate, phenyl (2-acryloyloxyethyl) phosphate, acid phosphoxyethyl methacrylate, methacroyloxyethyl acid phosphate, phosphoxy polyoxyethyleneglycol monomethacrylate, acid phosphoxy polyoxy propyleneglycol methacrylate, (meth) acryloyloxyethyl acid phosphate, (meth) acryloyloxypropyl acid phosphate, (meth) acryloyloxy-2-hydroxypropyl acid phosphate, (meth) acryloyloxy-3-hydroxypropyl acid phosphate, (meth) acryloyloxy-3-chloro-2-hydroxypropyl acid phosphate, and compounds having phosphono groups in a molecule such as vinylphosphoric acid and p-vinylbenzenephosphoric acid.

In the photocurable support material compositions for inkjet 3D printers according to the present invention, examples of the water-soluble ethylenically unsaturated monomers containing the sulfonic acids as the ionic groups and containing the counter ions include sodium salts, potassium salts and ammonium salts of compounds such as allylsulfonic acid, isoprene sulfonic acid, 2-(meth) acrylamide ethylsulfonic acid, 3-(meth) acrylamide propylsulfonic acid, 4-(meth) acrylamide butylsulfonic acid, 2-(meth) acrylamide-2-methylpropanesulfonic acid, p-vinylbenzene sulfonic acid, and vinyl sulfonic acid. The water-soluble ethylenically unsaturated monomers containing the ionic groups and the counter ions as exemplified above can be used alone or in combination of two or more kinds.

As the water-soluble ethylenically unsaturated monomer containing the ionic groups and the counter ions contained in the photocurable support material compositions for inkjet 3D printers of the present invention, the acrylates are preferable, and the monovalent salts of the acrylic acid such as the alkali metal salts, for example, the lithium salts, the sodium salts and the potassium salts, the ammonium salts and the amine salts are more preferable. Further, the alkali metal salts or the ammonium salts are further preferable, and the sodium salts, the potassium salts or the ammonium salts are particularly preferable. The potassium salts are the most preferable.

As the water-soluble ethylenically unsaturated monomers containing the ionic groups and the counter ions contained in the photocurable support material compositions for inkjet 3D printers of the present invention, in addition to the above, the polyvalent metal salts such as the zinc salts, the magnesium salts, the calcium salts, the aluminum salts, or the neodymium salts of the acrylic acid can be used. The zinc salts, the magnesium salts or the calcium salts are preferable as the polyvalent metal salts of the acrylic acids.

When the monovalent salts and the polyvalent metal salts of the acrylic acids are used together, supportability of the cured products obtained by photocuring the photocurable support material compositions for inkjet 3D printers can be further improved. Further, it is preferred embodiments of the, present invention to further use the below-described organic acids and/or the salts thereof in addition to the above-mentioned monomers.

In the photocurable support material compositions for inkjet 3D printers of the present invention, a content of the water-soluble ethylenically unsaturated monomers containing the ionic groups and the counter ions is preferably from 20 to 70 mass %, more preferably from 25 to 65 mass %, further more preferably from 30 to 60 mass %, in 100 mass % of the above composition. A lower limit is particularly preferably more than 30 mass %. In this case, supportability of the photocurable support material compositions for inkjet 3D printers can be further improved.

In addition, a total content of the monovalent salts and the polyvalent metal salts of the acrylic acids is preferably from 20 to 70 mass %, more preferably from 25 to 65 mass %, further preferably from 30 to 60 mass %, in 100 mass % of the photocurable support material composition for inkjet 3D printers. A lower limit is particularly preferably more than 30 mass %.

A content of the polyvalent metal salts of the acrylic acids is preferably not more than 15 mass % and more preferably not more than 10 mass % as an upper limit, and preferably not less than 0.5 mass % and more preferably not less than 1 mass % as a lower limit, in 100 mass % of the photocurable support material composition for inkjet 3D printers. In this case, supportability of the photocurable support material compositions for inkjet 3D printers can be further improved, and solubility of the compositions can be also further improved.

2. Other Unsaturated Monomer

The photocurable support material compositions for inkjet 3D printers of the present invention can contain unsaturated monomers other than the water soluble ethylenically unsaturated monomers containing the ionic groups and the counter ions. Examples of the other unsaturated monomers include: (meth) acrylic acid; (meth) acrylate such as methyl (meth) acrylate, ethyl (meth) acrylate, propyl (meth) acrylate, butyl (meth) acrylate, 2-ethylhexyl (meth) acrylate, pentyl (meth) acrylate, isoamyl (meth) acrylate, octyl (meth) acrylate, iso-octyl (meth) acrylate, isononyl (meth) acrylate, decyl (meth) acrylate, isodecyl (meth) acrylate, lauryl (meth) acrylate, tridecyl (meth) acrylate, isomyristyl (meth) acrylate, isostearyl (meth) acrylate, n-stearyl (meth) acrylate, cyclohexyl (meth) acrylate, benzyl (meth) acrylate, phenoxyethyl (meth) acrylate, phenoxyethoxyethyl (meth) acrylate, methoxyethyl (meth) acrylate, butoxyethyl (meth) acrylate, tetrahydrofurfuryl (meth) acrylate, isobornyl (meth) acrylate, dicyclopentenyl (meth) acrylate, dicyclopentanyl (meth) acrylate, methoxyethoxyethyl (meth) acrylate, 2-hydroxyethyl (meth) acrylate, 2-hydroxypropyl (meth) acrylate, 2-hydroxybutyl (meth) acrylate, 2-hydroxy-3-phenoxy propyl (meth) acrylate, t-butylcyclohexyl (meth) acrylate, 2-ethylhexyl-diglycol (meth) acrylate, 4-hydroxybutyl (meth) acrylate, methoxytriethyleneglycol (meth) acrylate, ethoxydiethyleneglycol (meth) acrylate, 2-(2-ethoxyethoxy) ethyl (meth) acrylate, 2-cyanoethyl (meth) acrylate, methyl=2-(hydroxymethyl) acrylate and 2-ethylhexylcarbitol (meth) acrylate; allylether such as phenylallylether, o-, m-, p-cresolmonoallylether, biphenyl-2-olmonoallylether, biphenyl-4-olmonoallylethers, butylallylether, cyclohexylallylether and cyclohexanemethanolmonoallylether; vinylether such as butylvinyl ether, butylpropenylether, butylbutenylether, hexylvinylether, ethylhexylvinylether, phenylvinylether, benzylvinylether, ethylethoxyvinylether, acetylethoxyethoxyvinylether, cyclohexylvinylether and adamantylvinylether; maleimide such as phenylmaleimide, cyclohexylmaleimide and n-hexylmaleimide; monomers having aromatic groups or monomers having alicyclic groups such as benzylacrylate, phenoxyethylacrylate, phenoxyethoxyethylacrylate, isobornyl (meth) acrylate, dicyclopentenyl (meth) acrylate, dicyclopentanyl (meth) acrylate, bisphenol A diacrylate, EO adduct of bisphenol A bis (meth) acrylate, PO adduct of bisphenol A bis (meth) acrylate and EO adduct of hydrogenated bisphenol A bis (meth) acrylate; polyoxyalkylenedi (meth) acrylate such as polyoxyethylenedi (meth) acrylate and polyoxypropylenedi (meth) acrylate; acroloylmorpholine; N-vinylpyrrolidone; hydroxyalkyl (meth) acrylate; acrylamide such as (meth) acrylamide, N, N-dimethylacrylamide and N-hydroxyethylacrylamide; or the like.

These may be used alone, or two or more of them may be used in combination.

A content of the other unsaturated monomers in 100% by mass of the composition is preferably 20 to 50 mass % and more preferably 25 to 45 mass %. It is also preferable that the content of the other unsaturated monomers is less than 2 mass % in 100 mass % of the photocurable support material composition. In such a case, an odor of the photocurable support material compositions for inkjet 3D printers can be further suppressed.

3. Organic Acid and/or Salt thereof

The photocurable support material compositions for inkjet 3D printers of the present invention may comprise organic acids and/or salts thereof. The organic acids and/or salts thereof are compounds other than the water-soluble ethylenically unsaturated monomers and the other unsaturated monomers.

Examples of the organic acids include organic sulfonic acids such as p-toluenesulfonic acid; organic phosphoric acids such as phenylphosphonic acid; organic carboxylic acids; and phosphoric esters. Among them, the organic carboxylic acids are preferable. Examples of the organic carboxylic acids include aliphatic carboxylic acids and aromatic carboxylic acids. Examples of the aliphatic carboxylic acids include formic acid, acetic acid, propionic acid, butyric acid, valeric acid, hexanoic acid, heptanoic acid, octanoic acid, octylic acid, nonanoic acid, decanoic acid, lauric acid, myristic acid, palmitic acid, stearic acid, behenic acid, tridecanoic acid, pentadecanoic acid, heptadecanoic acid, lactic acid, malic acid, citric acid, oxalic acid, malonic acid, succinic acid, fumaric acid, maleic acid, adipic acid, benzoic acid, glycine, polyacrylic acid and polylactic acid. Examples of the aromatic carboxylic acids include benzoic acid, phthalic acid and salicylic acid. Among them, the aliphatic carboxylic acids are more preferable, and lactic acid, propionic acid or polyacrylic acid is further preferable.

Examples of the salts of the organic acids include metal carboxylates. Examples of metals of the metal carboxylates include alkali metals such as lithium, sodium and potassium; alkaline earth metals such as magnesium, calcium, strontium and barium; zinc; and zirconium. Among them, the alkali metals such as potassium are preferable. As the salts of the organic acids, potassium lactate or potassium propionate is preferable.

When the photocurable support material compositions for inkjet 3D printers of the present invention comprise the organic acids and/or salts thereof, storage stability is further improved.

A content of the organic acids and/or salts thereof is preferably not more than 60 mass %, more preferably not more than 50 mass %, further preferably not more than 40 mass % as an upper limit, and as a lower limit, preferably not less than 5 mass %, more preferably not less than 15 mass %, further preferably not less than 25 mass %, in 100 mass % of the photocurable support material composition for inkjet 3D printers. In the case mentioned above, storage stability as well as the supportability/solubility of the photocurable support material compositions for inkjet 3D printers can be further improved.

4. Photopolymerization Initiator

The photocurable support material compositions for inkjet 3D printers of the present invention comprise photopolymerization initiators. Examples of the photopolymerization initiators include: benzoin compounds such as benzoin, benzoin methyl ether, benzoin ethyl ether, benzoin propyl ether and benzoin isobutyl ether; acetophenone compounds such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenylketone and 2-methyl-1-[4-(methylthio) phenyl]-2-morpholino propane-1-one; anthraquinone compounds such as 2-ethylanthraquinone, 2-t-butyl anthraquinone, 2-chloroanthraquinone and 2-amylanthraquinone; thioxanthone compounds such as 2,4-diethylthioxanthone, 2-isopropylthioxanthone, 2-chlorothioxanthone, and [3-(3,4-dimethyl-9-oxothioxanthen-2-yl) oxy-2-hydroxypropyl]-trimethyl azanium chloride; ketal compounds such as acetophenone dimethyl ketal and benzyl dimethyl ketal; benzophenone compounds such as benzophenone, 4-benzoyl-4'-methyl diphenyl sulfide and 4,4'-bismethyl aminobenzophenone; phosphine oxides such as 2,4,6-trimethylbenzoyldiphenylphosphine oxide, bis-(2,6-dimethoxybenzoyl)-2,4,4-trimethylpentylphosphine oxide and bis (2,4,6-trimethylbenzoyl)-phenyl phosphine oxide; and mixtures thereof.

These may be used alone, or two or more of them may be used in combination.

A content of the photopolymerization initiators is preferably 0.05 to 10.0 mass %, more preferably 0.1 to 7.0 mass %, further preferably 0.5 to 5.0 mass %, in 100 mass % of the composition.

5. Solvent

The photocurable support material compositions of the present invention may contain solvents. Examples of the solvents include water, methanol, ethanol, propanol, ethylene glycol, propylene glycol, polyethylene glycol, glycerol and alkylene oxide adducts containing oxypropylene groups such as polyoxypropylene glycol.

A lower limit of a content of the solvents is preferably not less than 5 mass %, more preferably not less than 10 mass %, further preferably not less than 15 mass %, and an upper limit is preferably not more than 75 mass %, more preferably not more than 74 mass %, further preferably not more than 60 mass %, in 100 mass % of the composition.

6. Additive

In the photocurable support material compositions of the present invention, other additives can be contained as required within a range not hindering the effects of the present invention. Specific examples thereof include photopolymerizing initiation aids, polymerization inhibitors, surfactants, coloring agents, antioxidants, chain transfer agents, and fillers.

Examples of the photopolymerizing initiation aids include tertiary amine compounds such as N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine.

Examples of the polymerization inhibitors include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutyl cresol, cyclohexanone oxime cresol, guaiacol, o-isopropyl phenol, butyraldoxime, methylethyl ketoxime, and cyclohexanone oxime.

Examples of the surfactants include PEG type nonionic surfactants such as 1 to 40 mol of ethylene oxide (hereinafter abbreviated to EO) adducts of nonylphenol, and 1 to 40 mol of EO adducts of stearic acid; polyhydric alcohol type nonionic surfactants such as sorbitan palmitic acid monoester, sorbitan stearic acid monoester, and sorbitan stearic acid trimester; fluorine-containing surfactants such as perfluoroalkyl EO 1 to 50 mol adduct, perfluoroalkyl carboxylate, perfluoroalkyl betaine; and modified silicone oils such as polyether-modified silicone oils, (meth) acrylate-modified silicone oils.

Examples of the coloring agents include toluidine red, permanent carmine FB, fast yellow G, disazoyellow AAA, disazoorange PMP, soluble azopigments, condensed azopigments, chelate azopigments, phthalocyanine blue, indanthrone blue, quinacridone red, dioxazine violet, basic dyes, acid dyes, aniline black, daylight fluorescent pigments, nitroso pigments, nitro pigments, natural pigments, metal oxides as inorganic pigments, and carbon black.

Examples of the antioxidants include 1,3,5-trimethyl-2,4,6-tris (3,5-di-t-butyl-4-hydroxybenzyl) benzene, dilauryl 3,3'-thiodipropionate, triphenyl phosphite, octylated diphenylamine, 2,6-di-t-butyl-p-cresol, and 2,2'-methylenebis (4-methyl-6-t-butylphenol).

Examples of the chain transfer agents include hydroquinone, diethylmethylamine, diphenylamine, diethyl disulfide, di-1-octyl disulfide, toluene, xylene, 1-butene, 1-nonene, dichloromethane, carbon tetrachloride, methanol, 1-butanol, ethylthiol, 1-octylthiol, acetone, methylethylketone, 2-methyl-2-propyl aldehyde, 1-pentyl aldehyde, phenol, m-cresol, p-cresol, and o-cresol.

Examples of the fillers include alumina powder, silica powder, talc, mica, clay, aluminum hydroxide, calcium carbonate, calcium silicate, aluminum powder, copper powder, carbon fiber, glass fiber, cotton fiber, nylon fiber, acrylic fiber, rayon fiber, microballoon, carbon black, metal sulfides, and wood powder.

These additives may be used alone or in combination of two or more kinds.

A content of the additives is preferably 0.05 to 30 mass%, more preferably 0.05 to 20 mass %, in 100 mass % of the composition.

The photocurable support material compositions of the present invention can be prepared by using the above-mentioned various components, and its preparation methods and conditions are not particularly limited. Examples of the preparation methods include methods of stirring and mixing with stirring and mixing devices such as general stirring blades, ultrasonic homogenizers, high-speed homogenizers, high-pressure homogenizers, planetary stirring devices, three-roll mills, ball mills, kitty mills, disk mills, pin mills, and Dyno-mills After preparing solutions, filtration may be carried out using various filters.

7. Odor of Photocurable Support Material Composition

The photocurable support material compositions of the present invention preferably have suppressed odor. Specifically, it is preferable that the irritating odor by the monomers is slight, and it is more preferable that there is no irritating odor by the monomers. In the photocurable support material compositions of the present invention, a content of the unsaturated monomer other than the water-soluble ethylenically unsaturated monomer is preferably less than 2 mass % in 100 mass % of photocurable support material composition. In that case, the odor can be more effectively suppressed.

8. Storage Stability of Photocurable Support Material Composition

The photocurable support material compositions of the present invention are preferably excellent in storage stability. Specifically, it is preferably that the compositions are stable for not less than 1 week and less than 1 month, more preferably for not less than 1 month, and further preferably for not less than 3 months. Here, "stable" means that the photocurable support material compositions are judged no change by visual observation after leaving the compositions to stand still in a sealed state at room temperature. No change means that no separation is occurring, or no gel body or no precipitate is generated in the compositions.

In the photocurable support material compositions of the present invention, storage stability and solubility can be further improved by preferably containing the organic acids and/or the salts thereof.

9. Curability of Photocurable Support Material Composition

The photocurable support material compositions of the present invention are preferably excellent in curability. On the curability, the compositions are preferably cured by irradiation with light of 100 to 2000 $mJ/cm^2$, and more preferably cured by irradiation with light of 100 to 1000 mJ/cm$^2$. Here, "cured" means that the compositions are no longer in liquid states and lose fluidity.

10. Water Solubility of Cured Product after Curing of Photocurable Support Material Composition Since the cured products after curing the photocurable support material compositions of the present invention are used as support materials, water solubility of the cured products is excellent as essential requirements of the support materials. In the water solubility, for example, when 0.5 g (surface area 4 cm$^2$) of the cured products are placed on a metal gauze and immersed in 100 g of water at room temperature (for example, around 25° C.), the cured products can dissolve in the water preferably within 2 hours, more preferably, the cured products can almost dissolve in the water within 1 hour, and further preferably, the cured products can dissolve in the water within 1 hour and insoluble matters are not visually observed.

11. Supportability

Supportability (ability to support) in the present invention is a performance of the cured products of the photocurable support material compositions to support cured products of model materials, and can be represented by hardness (Shore E) of the cured products of the support materials measured with a method described below.

In the photocurable support material compositions of the present invention, a content of the water-soluble ethylenically unsaturated monomers is preferably more than 30 mass % in 100 mass % of the photocurable support material composition, and then, the supportability can be further improved.

The photocurable support material compositions for inkjet 3D printers of the present invention preferably comprise 20 to 70 mass % of the water-soluble ethylenically unsaturated monomers containing the ionic groups and the counter ions, 0.05 to 10.0 mass % of the photopolymerization initiators and 20 to 75 mass % of the solvents, and more preferably, the compositions comprise 25 to 65 mass % of the water-soluble ethylenically unsaturated monomers containing the ionic groups and the counter ions, 0.5 to 5.0 mass % of the photopolymerization initiators and 30 to 74 mass % of the solvents.

Ink for Inkjet 3D Printers

The inks for inkjet 3D printers according to the present invention contain at least one of the above-mentioned photocurable support material compositions for inkjet 3D printers. The photocurable support material compositions for inkjet 3D printers comprised in the inks for inkjet 3D printers according to the present invention may be diluted with media.

The photocurable support material compositions for inkjet 3D printers can be used without modification (or directly) as the inks for inkjet 3D printers. On the other hand, the inks for inkjet 3D printers according to the present invention can be produced by mixing the media with the photocurable support material compositions for inkjet 3D printers. As the above-mentioned media, lipophilic media or aqueous media are preferable, and the aqueous media are more preferable.

The inks for inkjet 3D printers according to the present invention may contain other additives as necessary within a range not harmful to the effect of the present invention. Examples of the other additives include known additives such as emulsion stabilizers, penetration accelerators, ultraviolet absorbers, preservatives, fungicides, rust inhibitors, pH adjusters, surface tension regulators, defoaming agents, viscosity modifiers, dispersing agents, dispersion stabilizers, chelating agents, drying inhibitors (wetting agents), coloring agents, anti-fading agents, specific resistance adjusting agents, film regulators, antioxidants, and surfactants. These various additives can be added, for example, directly to the ink liquids.

A content of the photocurable support material compositions for inkjet 3D printers is preferably not less than 50 mass %, more preferably not less than 60 mass %, further preferably not lass than 70 mass % as a lower limit, and preferably not more than 100 mass % as an upper limit, in 100 mass % of the ink for inkjet 3D printers according to the present invention,.

In the inks for inkjet 3D printers of the present invention, viscosity at 25° C. is preferably 5 to 300 mPa·s, and surface tension is preferably 25 to 70 mN/m.

Cartridge for Inkjet 3D Printer

In the cartridges for inkjet 3D printers of the present invention, the above-mentioned inks for inkjet 3D printers are filled. Well-known cartridge forms may be used as forms of the cartridges for inkjet 3D printers of the present invention as long as the cartridges for inkjet 3D printers are filled with the above inks for inkjet 3D printers.

Method for Producing Support Material

In the methods for producing support materials of the present invention, support materials are produced by using any one of the above-described photocurable support material compositions for inkjet 3D printers or the above-described inks for inkjet 3D printers. The methods for producing support materials of the present invention are not particularly limited, as long as the above inks for inkjet 3D printers are used in the methods for producing support materials. Known methods such as methods for molding the inks by ejecting from nozzles, printing or the like, and methods for curing the molded inks with irradiating ultraviolet rays of about 100 mJ/cm$^2$ to 1500 mJ/cm$^2$, can be used.

[Method for Producing Optically Shaped Article]

The methods for producing optically shaped articles of the present invention are methods for producing optically shaped articles by using any one of the above-described photocurable support material compositions for inkjet 3D printers or the above-described inks for inkjet 3D printers.

The methods comprise: steps for forming support materials by using the photocurable support material compositions for inkjet 3D printers or the inks for inkjet 3D printers; steps for forming model materials; and steps for removing the support materials.

In the methods for producing optically shaped articles of the present invention, known methods can be used other than using the photocurable support material compositions for inkjet 3D printers or the inks for inkjet 3D printers in the steps for forming the support materials.

In the methods for producing optically shaped articles of the present invention, the cured products obtained by curing the support materials using the photocurable support material compositions for inkjet 3D printers or the inks for inkjet 3D printers have sufficient hardness, and since the cured products have excellent water solubility, excellent optically shaped articles can be easily produced.

EXAMPLES

Hereinafter, the present invention will be described in more detail with reference to examples, but the present invention is not limited by the following examples, and of course, it can be changed within a range that can conform to the gist of the foregoing and the following. All of them are included in the technical scope of the present invention.

Example 1

60 parts by mass of potassium acrylate (manufactured by Nippon Shokubai Co., Ltd.) as the water-soluble ethylenically unsaturated monomer and 1 parts by mass of Irgacure 2959 (manufactured by BASF Japan Ltd.) as a photopolymerization initiator were added to 40 parts by mass of water, and mixed by stirring to obtain a support material composition.

Examples 2 to 6 and Comparative Examples 1 to 5

In each of Examples 2 to 6 and Comparative Examples 1 to 5, a support material composition was obtained in the same manner of Example 1 except that the compounds and quantities (parts by mass) were changed as shown in the following Table 1. In Table 1, sodium acrylate manufactured by Nippon Shokubai Co., Ltd., zinc acrylate manufactured by Nippon Shokubai Co., Ltd., acrylic acid manufactured by Nippon Shokubai Co., Ltd., hydroxyethylacrylamide manufactured by Tokyo Chemical Industry Co., acryloyl morpholine manufactured by Tokyo Chemical Industry Co., Ltd., ethylene glycol manufactured by Nippon Shokubai Co., Ltd., PPG (polyoxypropylene glycol: P-400) manufactured by Adeka Corporation, Irgacure 184 manufactured by BASF Japan Ltd., and Irgacure TPO manufactured by BASF Japan Ltd. were used as commercially available products.

The support material compositions obtained in Examples 1 to 6 and Comparative Examples 1 to 5 were evaluated by the following evaluation methods.

(i) Oder Evaluation

Odor of the support material compositions obtained in Examples 1 to 6 and Comparative Examples 1 to 5 were evaluated. Evaluation criteria were as follows. Results are shown in Table 1.

A: No irritating odor by monomers is observed.
B: Slightly irritating odor by monomers is observed.
C: Slightly strong irritating odor by monomers is observed.
D: Strong irritating odor by monomers is observed.

(ii) Storage Stability Evaluation

The storage stabilities of the support material compositions obtained in Examples 1 to 6 and Comparative Examples 1 to 5 was evaluated with leaving the compositions to stand still in a sealed state for predetermined periods at room temperature. Evaluation criteria were as follows. Results are shown in Table 1.

A: The composition was stable for not shorter than 3 months.
B: The composition was stable for not shorter than 1 month.
C: The composition was stable for not shorter than 1 week and shorter than 1 month stable.
D: The composition was changed within 1 week.

(iii) Curability Evaluation

The support material compositions obtained in Examples 1 to 6 and Comparative Examples 1 to 5 were irradiated with light of 500 mJ/cm$^2$ or 1000 mJ/cm$^2$ to evaluate curability. Evaluation criteria were as follows. Results are shown in Table 1.

A: The composition was cured with light of 500 mJ/cm$^2$.
B: The composition was cured with light of 1000 mJ/cm$^2$.
D: The composition was not cured with light of 1000 mJ/cm$^2$, and remained in a liquid state.

(iv) Solubility Evaluation

A piece (1×1×0.5 cm) of the cured product, which was cured in (iii) Curability Evaluation, of each of the support material compositions of Examples 1 to 6 and Comparative Examples 2 to 5 was placed on a wire net, and placed in water having a water temperature of 25° C. and volume of 100 mL to evaluate solubility. Evaluation criteria were as follows. Results are shown in Table 1.

A: The composition was dissolved in the water within 1 hour to be a transparent solution by visual observation.
B: The composition was dissolved in the water within 1 hour to be a muddy white liquid by visual observation.
C: The composition was dissolved within 2 hours.
D: The composition was not dissolved within 2 hours.

(v) Supportability Evaluation

Hardness of the cured product, which was cured in (iii) Curability Evaluation, of each of the support material compositions of Examples 1 to 6 and Comparative Examples 2 to 5 was measured with Durometer E type (manufactured by Kobunshi Keiki Co., Ltd.) and evaluated. Evaluation criteria were as follows. Results are shown in Table 1.

A: not less than 30
B: not less than 20 and less than 30
C: not less than 10 and less than 20
D: less than 10 (immeasurable)

TABLE 1

|  | Example | | | | | | Comparative Example | | | | |
|---|---|---|---|---|---|---|---|---|---|---|---|
|  | 1 | 2 | 3 | 4 | 5 | 6 | 1 | 2 | 3 | 4 | 5 |
| Potassium acrylate | 60 | 60 | 40 | 30 | 49 | 50 | | | | | |
| Sodium acrylate | | 20 | | | | | | | | | |
| Zinc acrylate | | | | 1 | | | | | | | |
| Acrylic acid | | | 30 | | | | 70 | | | | |
| Hydroxyethylacrylamide | | | | | | | | 40 | | | 85 |
| Acryloyl morpholine | | | | | | | | | 30 | 5 | |
| Water | 40 | 30 | 40 | 40 | 50 | 20 | 30 | 60 | | | |
| Ethylene glycol | | 10 | | | | 30 | | | | | |
| PPG | | | | | | | | | 70 | 95 | 15 |
| Irgacure 184 | | 1 | | | | | | | 3 | | |
| Lucirin TPO | | | | | 1 | | | | | 3 | 1.5 |
| Irgacure 2959 | 1 | | 1 | 1 | 1 | | 2.1 | 5 | | | |
| Odor | A | A | A | C | A | A | D | C | C | C | D |
| Storage stability | C | C | C | A | C | C | A | A | A | A | A |
| Curability | A | A | A | A | A | A | D | A | A | A | A |
| Solubility | A | A | A | A | B | A | no evaluating | B | B | B | D |
| Supportability | A | A | B | B | A | B | no evaluating | D | D | D | A |

As shown in Table 1, it was found that the support material compositions containing the water-soluble ethylenically unsaturated monomers containing ionic groups and counter ions were more excellent in the solubility in the solvents after curing, and the hardness of the cured products was more sufficient than the support material compositions containing no water-soluble ethylenically unsaturated monomer.

Examples 7 to 21

For each of Examples 7 to 21, a support material composition was obtained in the same manner of Example 1 except that the compounds and quantities (parts by mass) were changed as shown in the following Table 2. The obtained support material compositions were evaluated by the above, evaluation method in the same manner of Example 1. Results are shown in Table 2.

As shown in Table 2, when the content of the water-soluble ethylenically unsaturated monomers was more than 30 mass % in 100 mass % of the support material composition, the supportability was more excellent. In addition, when the content of the other unsaturated monomers such as acrylic acid, hydroxyethyl acrylamide, acryloyl morpholine, hydroxyethyl acrylate, methoxyethyl acrylate was less than 2 mass % in 100 mass % of the support material composition, the odor of the compositions was more suppressed. Further, when the organic acids and/or the salts thereof were contained, more excellent results could be obtained on the storage stability. Also, as shown in Table 3, when the monovalent salts of acrylic acids and the polyvalent metal

TABLE 2

| | Example | | | | | | | | | | | | | | |
|---|---|---|---|---|---|---|---|---|---|---|---|---|---|---|---|
| | 7 | 8 | 9 | 10 | 11 | 12 | 13 | 14 | 15 | 16 | 17 | 18 | 19 | 20 | 21 |
| Potassium acrylate | 60 | 50 | 40 | 32 | 35 | 45 | 50 | 15 | 30 | 45 | 47 | 40 | 40 | 49 | 10 |
| Sodium acrylate | | 10 | | | | | | 10 | | | | | | | |
| Zinc acrylate | | | | | | | | | | | | | | 1 | |
| Acrylic acid | | | | | 5 | | 2 | | | | | | | | 30 |
| Hydroxyethyl-acrylate | | | | 18 | | | | | | | | | | | |
| Methoxyethyl-acrylate | | | | | 25 | | | 1.5 | | | | | | | |
| Polyacrylic acid | | | | | | | | | 8.5 | | | | | | |
| Lactic Acid | | | | 50 | 25 | | 30 | | | 40 | 38 | 30 | 25 | 50 | |
| Propionic acid | | | | | | 10 | | 38 | | | | | | | |
| Potassium lactate | | | | | | | | | | | | 15 | 20 | | |
| Potassium propionate | | | | | | | | | 30 | | | | | | |
| Water | 40 | 40 | 50 | | 5 | 45 | 20 | 35 | 30 | 15 | 15 | 15 | 15 | | 30 |
| Ethylene glycol | | 10 | | 5 | | | | | | | | | | | 30 |
| Irgacure 184 | | | | | | | 1 | | | 0.5 | | | | | 1 |
| Lucirin TPO | | | | 1 | 1 | | | | | 0.5 | 0.5 | | 1 | | |
| Irgacure 2959 | 0.5 | 1 | 0.5 | | | 1 | 1 | | 1 | | | 1 | | 1 | |
| Odor | A | A | A | C | C | B | A | B | A | A | A | A | A | A | C |
| Storage stability | C | C | C | A | B | B | A | A | B | A | A | A | A | A | A |
| Curability | A | A | A | A | A | A | A | B | B | B | A | B | B | A | B |
| Solubility | A | A | A | B | B | A | A | A | B | B | B | A | B | A | B |
| Supportability | A | B | B | A | A | B | B | C | C | B | B | B | A | A | C |

For each of Examples 22 to 26, a support material composition was obtained in the same manner of Example 1 except that the compounds and quantities (parts by mass) were changed as shown in the following Table 3. The obtained support material compositions were evaluated by the above evaluation method in the same manner of Example 1. Results are shown in Table 3.

TABLE 3

| | Example | | | | |
|---|---|---|---|---|---|
| | 22 | 23 | 24 | 25 | 26 |
| Potassium acrylate | 45 | 40 | 40 | 47 | 45 |
| Zinc acrylate | 5 | 10 | 15 | | |
| Magnesium acrylate | | | | | 5 |
| Calcium acrylate | | | | 3 | |
| Lactic Acid | 30 | 35 | 30 | 30 | 30 |
| Water | 15 | 15 | 15 | 10 | 10 |
| Ethylene glycol | 5 | | | 10 | 10 |
| Irgacure 2959 | 0.5 | 0.5 | 0.5 | 0.5 | 0.5 |
| Odor | A | A | A | A | A |
| Storage stability | A | A | A | A | A |
| Curability | A | A | A | A | A |
| Solubility | A | A | C | A | A |
| Supportability | A | A | A | A | A | salts were used in combination, and the organic acids and/or the salts thereof were further used, the supportability of the cured products obtained by photocuring the compositions could be improved more.

INDUSTRIAL APPLICABILITY

According to the photocurable support material compositions for inkjet 3D printers of the present invention, the photocurable support material compositions for inkjet 3D printers having excellent solubility in the solvent after curing, and having sufficient hardness of the cured product, can be provided.

The invention claimed is:
1. A photocurable support material composition for an inkjet 3D printer comprising:
   a mixture of water-soluble ethylenically unsaturated monomers;
   a photopolymerization initiator; and
   a solvent, and
   wherein said mixture of water-soluble ethylenically unsaturated monomers comprises:
   a first water-soluble ethylenically unsaturated monomer comprising a first ionic group and a monovalent counter ion; and a second water-soluble ethylenically unsaturated monomer comprising a second ionic group and a polyvalent counter ion, wherein the first water-soluble ethylenically unsaturated monomer and the second water-soluble ethylenically unsaturated monomer are used together, wherein the first water-soluble ethylenically unsaturated monomer comprises potassium acrylate, a content of said first water-soluble ethylenically unsaturated monomer being not more than 60 mass % in 100 mass % of said photocurable support material composition, wherein the second water-soluble ethylenically unsaturated monomer comprises zinc acrylate, a content of said second water-soluble ethylenically unsaturated monomer being not less than 1 mass % and not more than 15 mass % in 100 mass % of said photocurable support material composition, wherein a total content of said first water-soluble ethylenically unsaturated monomer and said second water-soluble ethylenically unsaturated monomer is not more than 70 mass % in 100 mass % of said photocurable support material composition, wherein a content of the solvent is not more than 74 mass % in 100 mass % of the composition, which comprises 50 mass % or less of water in 100 mass % of the composition, wherein said photocurable support material composition is able to form a cured product by irradiating said composition with light of 500 mJ/cm$^2$ or 1000 mJ/cm$^2$, and said cured product of said composition is water-soluble such that said cured product is able to be dissolved in water within 1 hour when a piece (1×1×0.5 cm) of said cured product is placed on a wire net and placed in water having a water temperature of 25° C. and volume of 100 mL, and wherein the photocurable support material composition comprises 5-15 mass % of zinc acrylate and 35-45 mass % of potassium acrylate.

2. The photocurable support material composition for an inkjet 3D printer of claim 1, wherein a content of said mixture of water-soluble ethylenically unsaturated monomers is more than 30 mass % in 100 mass % of said photocurable support material composition for an inkjet 3D printer.

3. The photocurable support material composition for an inkjet 3D printer of claim 1, further comprising another unsaturated monomer in an amount of less than 2 mass % in 100 mass % of said photocurable support material composition for an inkjet 3D printer.

4. The photocurable support material composition for an inkjet 3D printer of claim 1, further comprising an organic acid and/or a salt thereof.

5. The photocurable support material composition for an inkjet 3D printer of claim 1, comprising:
   20 to 70 mass % of said mixture of water-soluble ethylenically unsaturated monomers;
   0.05 to 10.0 mass % of said photopolymerization initiator; and
   20 or more mass % of said solvent.

6. The photocurable support material composition for an inkjet 3D printer of claim 1, wherein the content of the first water-soluble ethylenically unsaturated monomer is not less than 10 mass % and not more than 60 mass % in 100 mass % of said photocurable support material composition for an inkjet 3D printer.

7. The photocurable support material composition for an inkjet 3D printer of claim 1, wherein the total content of said first water-soluble ethylenically unsaturated monomer and said second water-soluble ethylenically unsaturated monomer is not less than 20 mass % and 50 mass % or less in 100 mass % of said photocurable support material composition for an inkjet 3D printer.

8. The photocurable support material composition for an inkjet 3D printer of claim 1, wherein the photopolymerization initiator is at least one compound of acetophenone compounds and/or at least one compound of phosphine oxides.

9. The photocurable support material composition for an inkjet 3D printer of claim 1, wherein the photopolymerization initiator is at least one compound of acetophenone compounds.

* * * * *